(12) United States Patent
Trompiz

(10) Patent No.: US 9,101,855 B2
(45) Date of Patent: Aug. 11, 2015

(54) OPTIMUM NET WASH OIL FLOW RATE IN CRUDE VACUUM DISTILLATION UNITS

(75) Inventor: Carlos Trompiz, Deer Park, TX (US)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 868 days.

(21) Appl. No.: 13/354,655

(22) Filed: Jan. 20, 2012

(65) Prior Publication Data

US 2013/0186739 A1    Jul. 25, 2013

(51) Int. Cl.
  *B01D 3/42*  (2006.01)
(52) U.S. Cl.
  CPC ............ *B01D 3/4272* (2013.01); *B01D 3/4211* (2013.01)
(58) Field of Classification Search
  None
  See application file for complete search history.

(56) References Cited

U.S. PATENT DOCUMENTS

| 3,150,064 | A | | 9/1964 | Dobson |
| 3,237,376 | A | * | 3/1966 | Bauer .............................. 95/16 |
| 3,420,748 | A | | 1/1969 | Johnson et al. |
| 8,864,951 | B2 | * | 10/2014 | Anderson et al. ............... 203/40 |
| 2002/0189453 | A1 | | 12/2002 | Chosnek et al. |
| 2009/0314623 | A1 | | 12/2009 | Pihlaja et al. |

FOREIGN PATENT DOCUMENTS

EP    2072602    6/2009

OTHER PUBLICATIONS

Trompiz, Carlos et al. "Entrainment from Spray Distributors for Packed Columns". Ind. Eng. Chem. Res. 2000, 39, 1797-1808.*
Patent Cooperation Treaty, EPO, "Notification of Trasnmiattal of the International Search Report and the Written Opinion of the International Searching Authority, or the Declaration", PCT Application No. PCT/US13/22172, issued Jun. 21, 2013.
Trompiz, C. et al., "Entrainment from Spray Distributors for Packed Columns", Industrial and Engineering Chemistry Research, vol. 39, pp. 1797-1808, 2000.

* cited by examiner

*Primary Examiner* — Nina Bhat
*Assistant Examiner* — Elizabeth Cardin
(74) *Attorney, Agent, or Firm* — Fish & Tsang, LLP

(57) ABSTRACT

Systems and methods are described for optimizing a net wash oil flow rate of a distillation unit to maximize a yield of distillate products. Based at least in part upon an incoming wash oil and total feed flow rates to the distillation unit, a wash oil entrainment amount can be calculated using an entrainment engine and an entrainment signal produced. The incoming wash oil flow rate to the distillation unit can be automatically adjusted based on the wash oil entrainment estimation while the distillation unit is operating.

9 Claims, 2 Drawing Sheets

OPTIMUM NET WASH OIL FLOW RATE IN CRUDE VACUUM DISTILLATION UNITS

FIELD OF THE INVENTION

The field of the invention is distillation units.

BACKGROUND

Spray nozzle distributors are widely used in distillation and absorption units to provide a uniform liquid distribution to the upper surface of packed beds. For example, in typical crude oil vacuum distillation units, wash oil is sprayed from the spray nozzles onto a wash bed to remove contaminants from a feed vapor or flash zone vapor. Spray nozzle distributors are more resistant to plugging and coking than other types of distributors. However, the use of spray nozzles can lead to a significant entrainment of the wash oil.

The wash oil entrainment must be estimated to determine the net wash oil flow rate that reaches the wash bed. Although the amount of entrainment depends on the actual operating conditions, the total wash oil flow rate is generally kept constant at its design value during operation of distillation units, without accounting for variations in process conditions that occur during operation. Such practice fails to optimize the net wash oil flow rate as the operating conditions in distillation units may vary, especially with changes to the feed rate.

Alternatively, it is known in the art to adjust the total wash oil flow rate proportionally to the feed rate (i.e., maintain a constant ratio of the total wash oil rate to the feed rate). See, e.g., EPO pat. publ. no. 2072602A1 to Chiyoda Corp. (publ. June 2009). However, this practice may not provide an optimum net wash oil rate, and could lead to coke formation of the wash bed and unscheduled shutdowns. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for systems and methods that allow for continuous optimization of a net wash oil flow rate in distillation units.

SUMMARY OF THE INVENTION

The inventive subject matter provides apparatus, systems and methods for continuous optimization of a net wash oil flow rate of a distillation unit to maximize a yield of distillate products. In this manner, as process conditions change within the distillation unit, the total wash oil flow rate can be automatically adjusted to account for these changes and thereby optimize the net wash oil flow rate based on the current process conditions of the distillation unit. Optimizing the net wash oil flow rate allows for maximum profitability in terms of distillate product quality and yield, and can help avoid coke formation of the wash bed and unscheduled shutdowns.

In a preferred embodiment, an incoming wash oil flow rate and a total feed flow rate to a distillation unit can be monitored by a flow sensor or other means. An entrainment engine can receive and utilize the respective flow rates to calculate a wash oil entrainment estimate within the distillation unit. Using the estimated wash oil entrainment value, the incoming wash oil flow rate can be manually, and preferably automatically, adjusted while the distillation unit is in operation.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based systems and methods for continuous optimization of a net wash oil flow rate of a distillation unit, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including automatic adjustment of a total wash oil flow rate of a distillation unit based at least in part upon an entrainment estimation. Such automatic adjustments thereby allows for continuous optimization of a net wash oil flow rate to the wash bed, which advantageously maximizes the distillate product yield without affecting the product quality and while avoiding coke formation in the wash bed.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
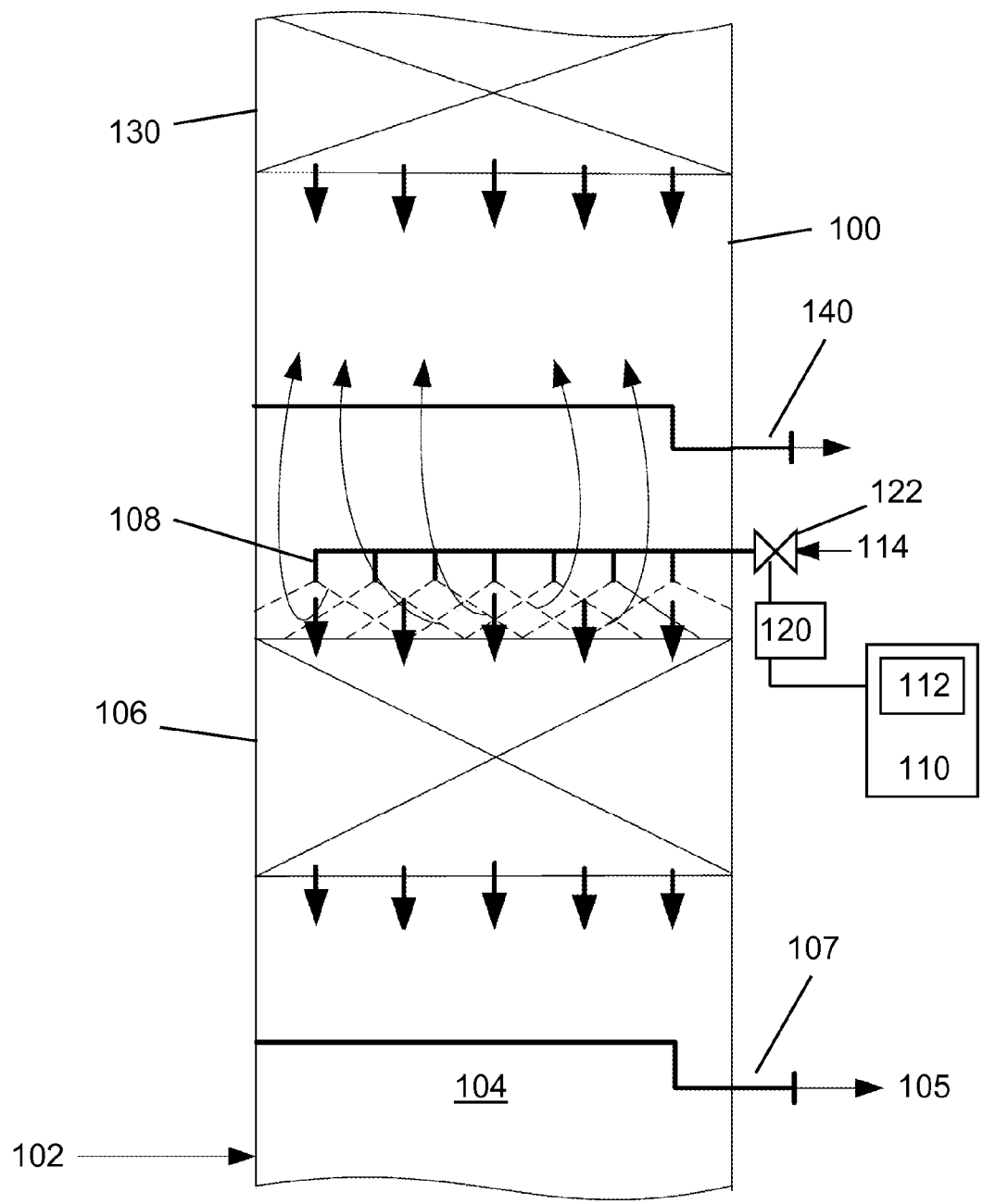
FIG. 1 is a schematic of an embodiment of a distillation unit configured to allow for continuous optimization of a net wash oil flow rate.

In FIG. 1, an embodiment of a distillation unit 100 is shown, in which feed fluid 102 is fed into a high temperature flash zone 104 of the distillation unit 100. Contemplated distillation units include, for example, crude oil vacuum distillation units and other suitable distillation units. From the flash zone 104, at least a portion of the feed fluid 102 vaporizes and the vapor ascends through a wash bed 106 or other suitable packing. To remove any entrained feed liquid and prevent coking in the wash bed 106, the ascending feed vapor can be washed with wash oil 114 distributed by spray nozzles 108. A total overflash fluid 105 comprising the net overflash fluid and entrained feed liquid can exit the distillation unit 100 via collector 107.

A portion of the wash oil from spray nozzles may be entrained by ascending vapor and only a net wash oil reaches the wash bed 106. To optimize the net wash oil flow rate and thereby maximize a yield of distillate products from collector 140, a control device 110 can be used that is configured to adjust the flow rate of total wash oil 114 to the distillation unit 100. As used herein, the term "net wash oil flow rate" is the wash oil that reaches wash bed 106 and equals the flow rate of total wash oil 114 less the amount of liquid entrainment from spray nozzles 108 or other distributors.

To optimize the net wash oil flow rate, a control device 110 can be used that has an entrainment engine 112. The entrainment engine 112 can be configured to estimate an amount of wash oil that is entrained in distillation unit 100 based at least in part upon an incoming wash oil flow rate through the spray nozzles 108 and a total feed flow rate to the distillation unit 100. Some contemplated correlations that could be used by the entrainment engine 112 in its estimation are described in the article "Entrainment from Spray Distributors for Packed Columns" Ind. Eng. Chem. Res. 2000, 39, 1797-1808.

By estimating the amount of wash oil entrainment in the distillation unit 100, the net wash oil flow rate can be determined by subtracting the estimated entrainment from the total wash oil flow rate. The entrainment engine 112 can be further configured to produce an entrainment signal as a function of this estimate. Preferably, the entrainment signal can be produced periodically during operation of the distillation unit 100, such that the rate of incoming wash oil 114 flowing through spray nozzles 108 can be periodically or continuously adjusted as needed. It is especially preferred that the entrainment engine 112 is further configured to produce the entrainment signal when the estimated entrainment varies by at least 5%, and more preferably, by at least 1%.

A valve actuator 120 can be functionally coupled to an inlet valve 122 configured to regulate an incoming flow rate of wash oil through the spray nozzles 108. In preferred embodiments, the valve actuator 120 can be configured to receive the entrainment signal, and vary the incoming flow rate of the wash oil through the inlet valve as a function of the entrainment signal. Thus, for example, if the estimated entrainment increases from a previous estimate, the valve actuator 120 can cause the incoming wash oil flow rate to be increased.

In some contemplated embodiment, the entrainment engine 112 can be further configured to analyze information about the spray nozzles 108 including, for example, (i) the number of spray nozzles 108 in the distillation unit 100 configured to distribute the wash oil above a wash bed 106 or other packing surface adjacent to at least one of the spray nozzles 108, (ii) the arrangement of the spray nozzles 108, (iii) the distance of the spray nozzles 108 from the adjacent packing surface (e.g., wash bed 106), (iv) the orifice size of the spray nozzles 108, and (v) the wash oil pressure drop across the spray nozzles 108. In such embodiments, the entrainment engine 112 can base its estimate of the amount of wash oil entrainment at least in part upon the spray nozzle information.

By optimizing the net wash oil flow rate during operation of the distillation unit 100, the profit of the distillation unit 100 can be maximized because the distillate product yield is maximized without affecting the product quality while avoiding coke formation in the wash bed 106. The entrainment engine 112 that monitors the various operating variables of the distillation unit 100 can utilize one or more correlations to (a) estimate the wash oil entrainment at any time and (b) adjust the total wash oil flow rate through inlet valve 122 to arrive at an optimal net wash oil flow rate.

Figure 2:
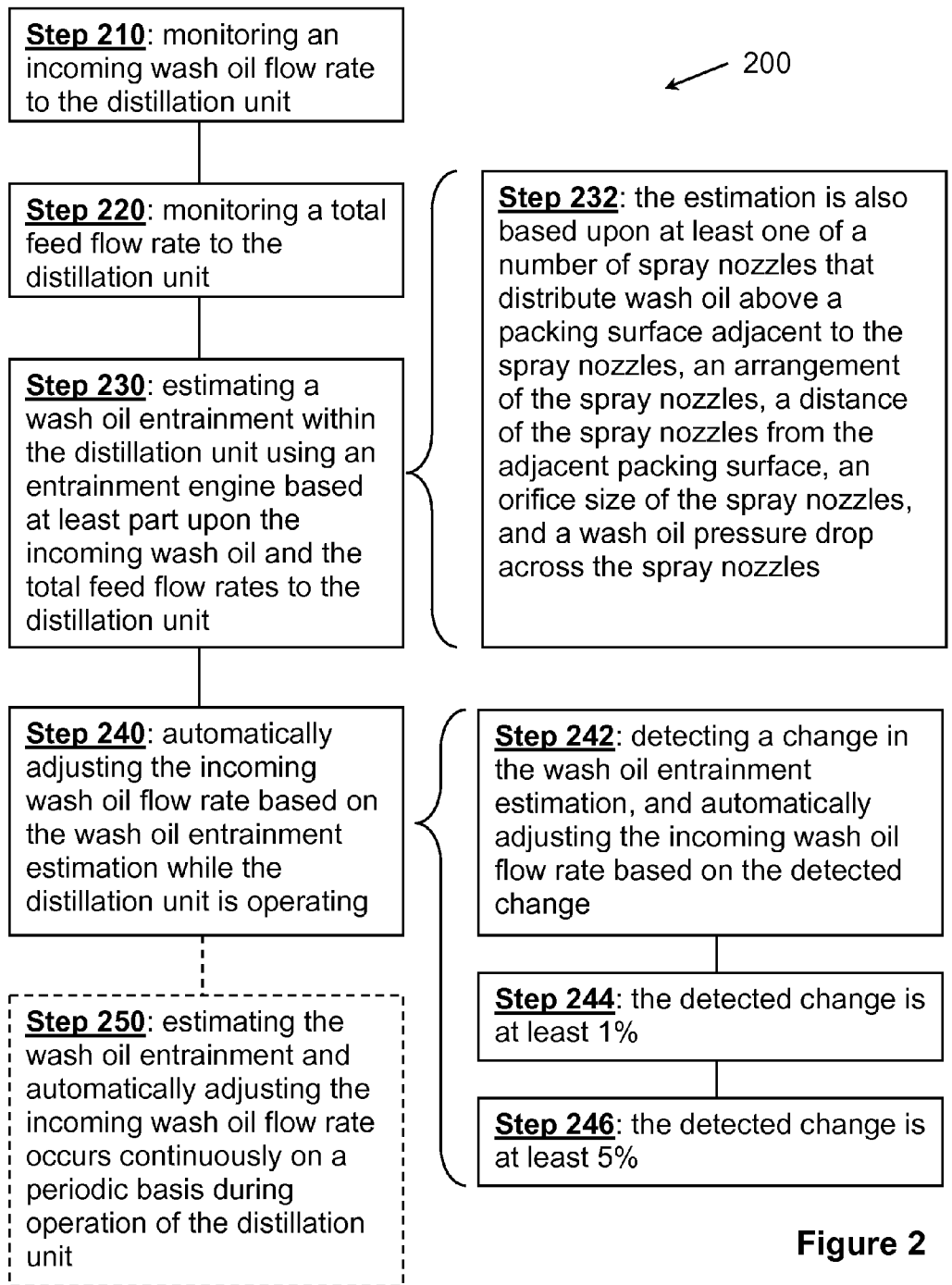
FIG. 2 is a flowchart of an embodiment of a method for continuous optimization of a net wash oil flow rate of a distillation unit.

In FIG. 2, a method 200 for continuous optimization of a net wash oil flow rate of a distillation unit is described that helps to maximize a yield of distillate products from the distillation unit.

In step 210, an incoming wash oil flow rate to the distillation unit can be monitored. A total feed flow rate to the distillation unit can also be monitored in step 220. In a crude vacuum distillation unit, for example, the total feed flow rate is defined as the reduced crude (i.e., the bottom of the crude atmospheric distillation unit) entering the crude vacuum distillation unit. By monitoring the total feed flow rate, the current vapor flow rate can be estimated, which can then be used by the entrainment engine to estimate an entrainment amount.

Using an entrainment engine, an amount of wash oil entrainment can be estimated within the distillation unit in step 230 based at least part upon the incoming wash oil and the total feed flow rates to the distillation unit. In step 232, the estimation can be further based on at least one of the following: (i) a number of spray nozzles that distribute wash oil above a packing surface adjacent to the spray nozzles, (ii) an arrangement of the spray nozzles, (iii) a distance of the spray nozzles from the adjacent packing surface, (iv) an orifice size of the spray nozzles, and (v) a wash oil pressure drop across the spray nozzles.

Using the entrainment engine's estimation, the incoming wash oil flow rate can be automatically adjusted in step 240 while the distillation unit is in operation. Preferably, the incoming wash oil flow rate is automatically adjusted in step 242 after a change is detected in the wash oil entrainment estimation. In this manner, the incoming wash oil flow rate can be adjusted based at least in part upon the detected change. It is especially preferred that the incoming wash oil flow rate can be automatically adjusted in step 244 when the detected change in the wash oil entrainment estimation is at least 1%, and more preferably at least 5% in step 246.

Optionally, in step 250, the estimation of the wash oil entrainment and automatic adjustment of the incoming wash oil flow rate can occur continuously on a periodic basis during operation of the distillation unit.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for continuous optimization of a net wash oil flow rate of a distillation unit to maximize a yield of distillate products, comprising:
    monitoring an incoming wash oil flow rate to the distillation unit;
    monitoring a total feed flow rate to the distillation unit;
    receiving, by an entrainment engine, the incoming wash oil flow rate and the total feed flow rate, and generating a wash oil entrainment estimate as a function of at least the incoming wash oil and the total feed flow rates to the distillation unit; and
    producing, by the entrainment engine, an entrainment signal when the wash oil entrainment estimate varies by at least 1%, and automatically adjusting the incoming wash oil flow rate based on the entrainment signal.

2. The method of claim 1, wherein the step of generating the wash oil entrainment estimate is further based upon at least one of a number of spray nozzles that distribute wash oil above a packing surface adjacent to the spray nozzles, an arrangement of the spray nozzles, a distance of the spray nozzles from the adjacent packing surface, an orifice size of the spray nozzles, and a wash oil pressure drop across the spray nozzles.

3. The method of claim 1, wherein the steps of generating the wash oil entrainment estimate and automatically adjusting the incoming wash oil flow rate occurs continuously on a periodic basis during operation of the distillation unit.

4. The method of claim 1, wherein the entrainment signal is produced when the wash oil entrainment estimate varies by at least 5%.

5. A control device that is configured to optimize a net wash oil flow rate of a distillation unit to maximize a yield of distillate products, comprising:
    an inlet valve configured to regulate an incoming flow rate of wash oil through at least one spray nozzle;
    an entrainment engine configured to (a) estimate an entrainment of the wash oil within the distillation unit based at least in part upon an incoming wash oil flow rate through the at least one spray nozzle and a total feed flow rate to the distillation unit, and (b) produce an entrainment signal when the estimated entrainment varies by at least 1%; and
    a valve actuator functionally coupled to the inlet valve, the valve actuator configured to receive the entrainment signal and cause a change in the incoming flow rate based upon the entrainment signal.

6. The control device of claim 5, wherein the entrainment engine is further configured to analyze information about the at least one spray nozzle to generate spray nozzle information, and wherein the entrainment estimation is based at least in part upon the spray nozzle information.

7. The control device of claim 6, wherein the spray nozzle information comprises at least one of a number of spray nozzles configured to distribute the wash oil above a packing surface adjacent to at least one spray nozzle, an arrangement of the spray nozzles, a distance of the spray nozzles from the adjacent packing surface, an orifice size of the spray nozzles, and a wash oil pressure drop across the spray nozzles.

8. The control device of claim 5, wherein the entrainment engine is further configured to produce the entrainment signal on a periodic basis during operation of the distillation unit.

9. The control device of claim 5, wherein the entrainment engine is configured to produce the entrainment signal when the estimated entrainment varies by at least 5%.

* * * * *